United States Patent [19]
Flinth et al.

[11] 4,036,315
[45] July 19, 1977

[54] WEIGHING SYSTEM

[75] Inventors: Rune Flinth; Nordstrom Kjell, both of Vasteras, Sweden

[73] Assignee: Transcale AB, Vasteras, Sweden

[21] Appl. No.: 730,074

[22] Filed: Oct. 6, 1976

Related U.S. Application Data

[63] Continuation of Ser. No. 587,112, June 16, 1975, abandoned.

[51] Int. Cl.$^2$ .............................................. G01G 19/04
[52] U.S. Cl. ......................................... 177/1; 177/163
[58] Field of Search .................. 177/1, 134, 135, 163, 177/DIG. 8

[56] References Cited

U.S. PATENT DOCUMENTS

| 3,028,923 | 4/1962 | Locher | 177/132 |
| 3,825,734 | 7/1974 | Jacobs | 177/25 X |

FOREIGN PATENT DOCUMENTS 1,094,437  12/1967  United Kingdom ................ 177/163

Primary Examiner—Joseph W. Hartary

[57] ABSTRACT

A weighing system for weighing a vehicle such as a torpedo car containing a body of molten metal where the center of gravity of the body of molten metal may shift in an uncontrollable manner within the vehicle and which vehicle has a first group of axles at the forward end thereof and a second group of axles at the rearward end thereof with each axle having at least two wheels thereon and wherein the axles of each group are symmetrically spaced about a center through which the load is applied to the axle group. The weighing system includes first and second weighing devices. The weighing devices are located so that the first weighing device engages the wheels of a fraction of the axles of the first group of axles and the second weighing device engages the wheels of a fraction of the axles of the second group of axles.

9 Claims, 7 Drawing Figures

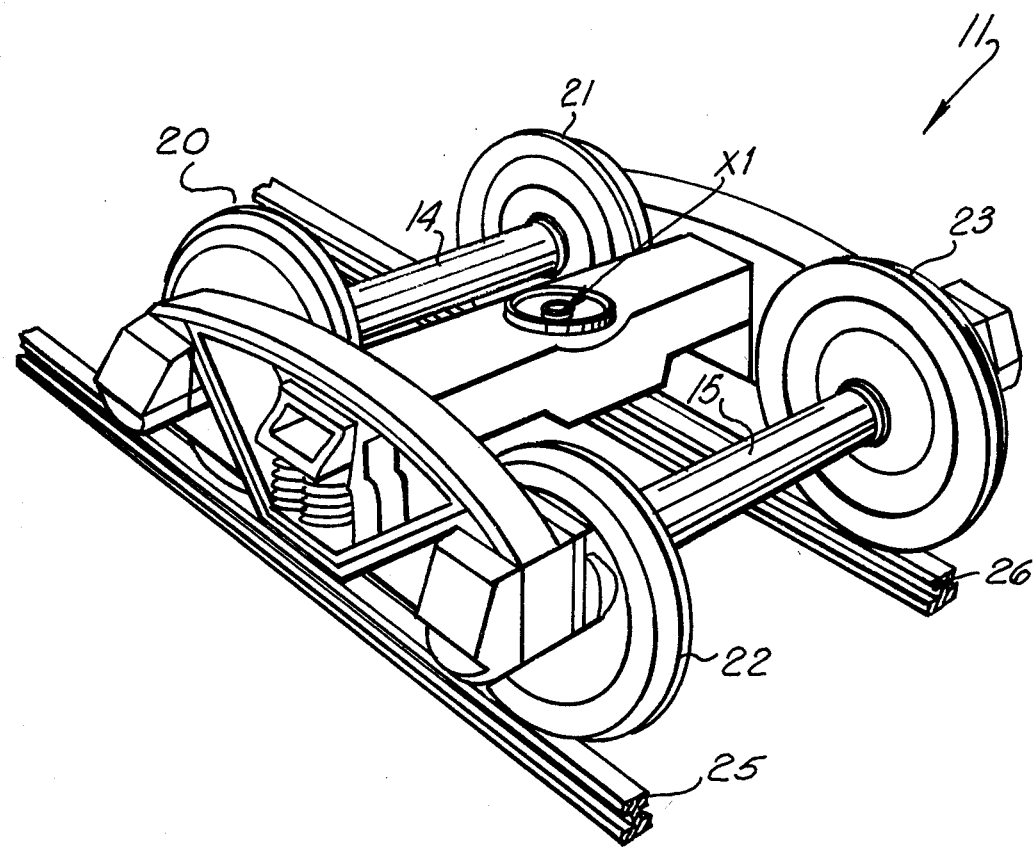
FIG. 1
FIG. 2
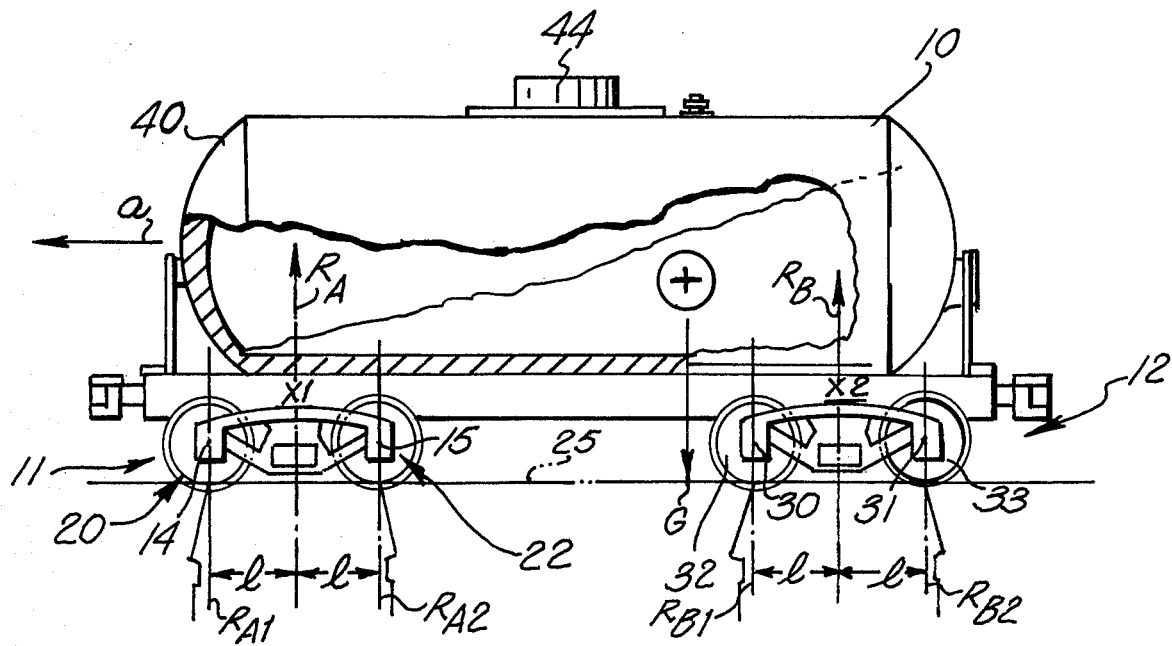

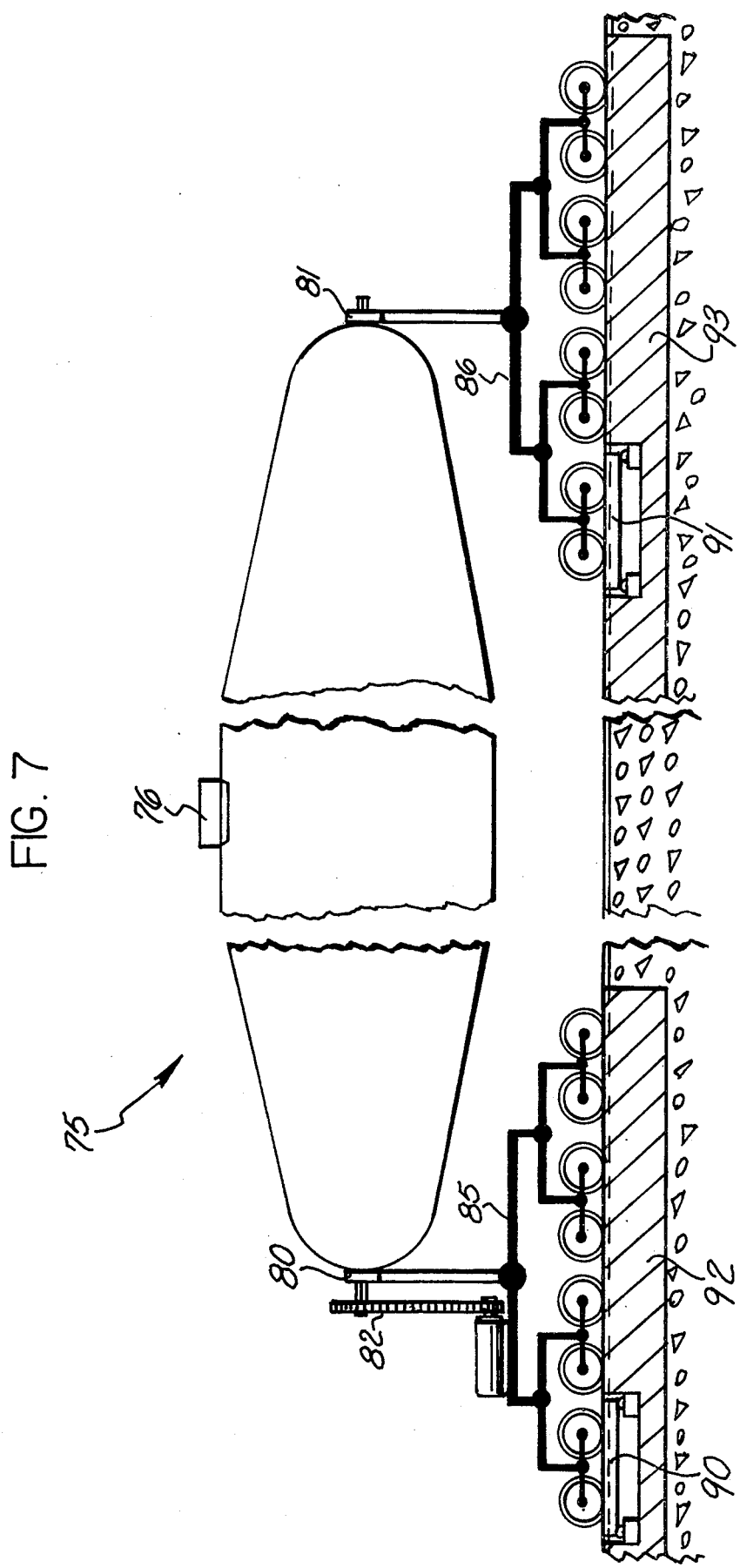

WEIGHING SYSTEM

This is a continuation of application Ser. No. 587,112 filed June 16, 1975 now abandoned.

BACKGROUND OF THE INVENTION

The present invention relates to a static or dynamic weighing system, and particularly to a system for weighing loads where the weight of the load may be distributed in an uncontrollable manner within the load carrier. In particular, the weighing system of the present invention is applicable to the weighing of torpedo cars which run on tracks and carry molten metal from an open hearth to a basic oxygen furnace. Torpedo cars are extremely long and carry great weights.

The molten metal load in a torpedo car will shift due to acceleration and deceleration of the car, as will any liquid carried by a vehicle. The shifting of the load in a back-and-forth manner continues over a time interval. This shifting causes a continuing unbalancing of the load on the wheels of the car. Further, when the car is filled or emptied, the load will be unevenly distributed, if the tracks on which the car rests are not level.

The shifting of the weight of the liquid in a load carrier, such as a torpedo car, has made weighing of the liquids difficult, and known systems suffer from a lack of accuracy. For example, in known systems of weighing, one wheel or all of the wheels on one end of a car are weighed. In such a system, when the car is accelerated or decelerated, the shifting weight will cause an inaccurate measurement to occur. Likewise, in such known systems an inaccurate weight measurement would occur, if the track is not level, as known to those skilled in the art.

Another known system for weighing torpedo cars or the like would be to weigh all of the wheels at both ends of the car simultaneously. In order to weigh all of the wheels at each end of the car, it is necessary to have weighing platforms which are extremely long and of great size, particularly when applied to a torpedo car where there may be as many as sixteen axles at each end of the car. In such a case, the size of the platform and the size of the beams which carry all of the wheels must be long and capable of withstanding substantial loads. Accordingly, the beams must be deep necessitating a deep pit. Further, the bending moment on such beams is quite large because of the length of the beams. Accordingly, the prior art systems either suffer from either or both of the following: (1) the fact that the shifting weight results in inaccurate weighing and (2) the size of the weighing device must be extremely large in order to carry the significant loads applied thereto.

SUMMARY OF THE PRESENT INVENTION

The present invention is directed toward a weighing system for weighing loads such as liquids where the distribution of the load is uncontrollable, such as the molten metal in a torpedo car. The system of the present invention provides accurate weighing, either while the load is at rest (static), or while moving (dynamic), is inexpensive to manufacture and permits rapid weighing.

The present invention is adaptable for use with any standard liquid-carrying vehicle, such as a torpedo car, which has a plurality of axles within forward and rear axle groups (commonly termed bogeys) symmetrically positioned beneath two pivotal points on opposite ends of the carrier. These two pivotal points allow the wheels to pivot in a vertical plane so that the car can readily traverse a track which is horizontally uneven. Further, the pivot points allow the wheels to turn when the car encounters a curve in the track.

While the load distribution within the carrier is not constant, the combined weight at each of the two pivotal points is equal to the toal weight and displacement of liquid from one end of the carrier always results in a corresponding weight increase at the opposite end. Furthermore, since the wheels under each of the pivotal points are symmetrically spaced from the pivotal axis, each axle supports a load which is substantially equal to that supported by the other axles within the same axle group.

Although the load may be shifting from one end of the car to the other, the sum of the forces exerted at each pivotal point is equal to the total weight, and furthermore the weight supported by one of the forward axles added to the weight supported by one of the rear axles is a constant fraction of the total weight.

The present invention provides the substantial advantages noted above by providing two spaced weighing devices (front and rear). Each of the weighing devices is constructed and located so that each engages only a fraction of the wheels of an axle group. Basically, the present invention utilizes two weighing platforms spaced apart and a size so as to engage only a fraction of the wheels of each bogey.

By having the platforms located to engage only a fraction of the wheels of each bogey, an accurate weighing can be achieved and also the size of the platform can be minimized. This is particularly significant when applied to the weighing of the torpedo cars where the total weight may be in the order of 500-1000 tons, the car may be 150 to 200 feet, and the length of the front and rear bogeys may each be in the order of 60-100 feet.

A preferred spacing between the weighing platforms permits a multiplicity of weighing opportunities as a car moves over the platforms. Due to the identical spacing between wheels in the bogeys of any given car, if the platforms are spaced a distance equal to the distance between the centers of the bogeys and the platforms encounter only the wheels on one axle, when the first wheel in one bogey contacts the first platform, the first wheel in the bogey at the opposite end of the car will contact the other platform simultaneously. As a car rolls over the weighing platforms, the second wheel of the first bogey will contact the first platform at the same time the second wheel of the second bogey contacts the second platform. If the fraction of axles being weighed includes a number of axles, the multiplicity of weighing opportunities still exists.

It should be understood that friction in a bogey can cause unequal weight distribution on the wheels. This would introduce error in the weighings in the order of a few percent. Multiple weighings and averaging of the multiple weighings can provide a more accurate reading and minimize the weight. Multiple weighings of the same wheels would tend to provide a more accurate reading as well as multiple weighings of different wheels. In the case of multiple weighings of different wheels the weight from wheel to wheel will tend to cancel. In the case of multiple weighings of the same wheels statistically the reading will be more accurate than a single reading.

The above is basically true assuming that all of the wheels which are weighed are in the same horizontal plane, i.e. level. If the wheels adjacent the wheels being weighed recede more than the wheels being weighed due to deflection of the rails, the weight will be shifted to the wheel in the higher plane and an inaccurate indication will result. The present system includes a foundation to perfectly support all of the wheels of the axle group containing the wheels being weighed. The foundation is designed in order to equalize the rail deflection of the wheels of the axial group not being weighed with the wheels of the axial group being weighed. As a result, it is desirable to provide the foundation with a stiffness substantially equal to the stiffness of the weighing platform in order to equalize deflection of the wheels.

Further, savings are realized with the present invention from both maintenance and construction costs. Because the actual area of the weighing platforms often is less than one-tenth of the size of a platform necessary to support the entire car, the surface exposed to spillage from the car is reduced, thereby resulting in reduced maintenance costs. Initial construction costs are reduced as the maximum capacity is just a fraction of what is required for the single platform scale which supports the entire weight. Further, the weighing system of the present invention is extremely accurate and minimizes weighing platform size.

BRIEF DESCRIPTION OF THE DRAWINGS

Further features of the present invention will be apparent to those skilled in the art to which it relates from the following description made with reference to the accompanying drawings in which:

FIG. 1 illustrates a standard railroad car bogey;

FIG. 2 is a force diagram which illustrates the principle on which the present invention is based;

FIG. 7 illustrates schematically a torpedo car and a system of the present invention for weighing same.

DESCRIPTION OF THE EMBODIMENTS OF THE INVENTION

Figure 3:
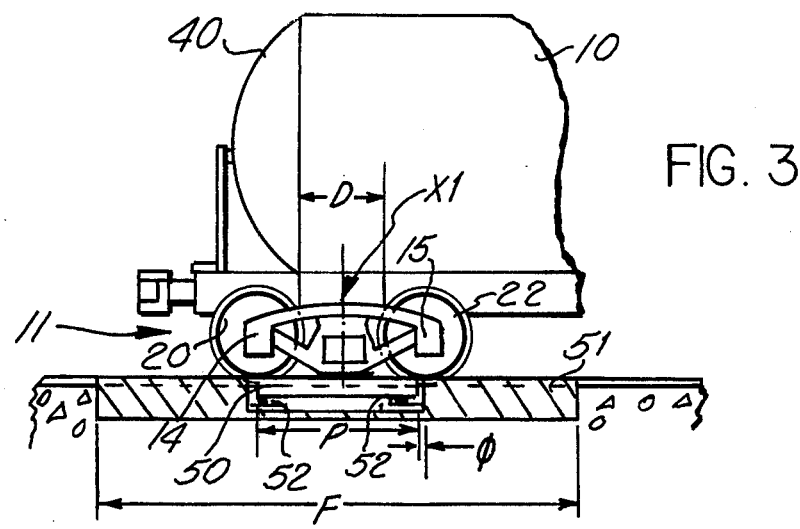
FIG. 3 illustrates the maximum length of the weighing platform which allows only a fraction of the wheels from each axle group to contact the platform at one time.
Figure 4:
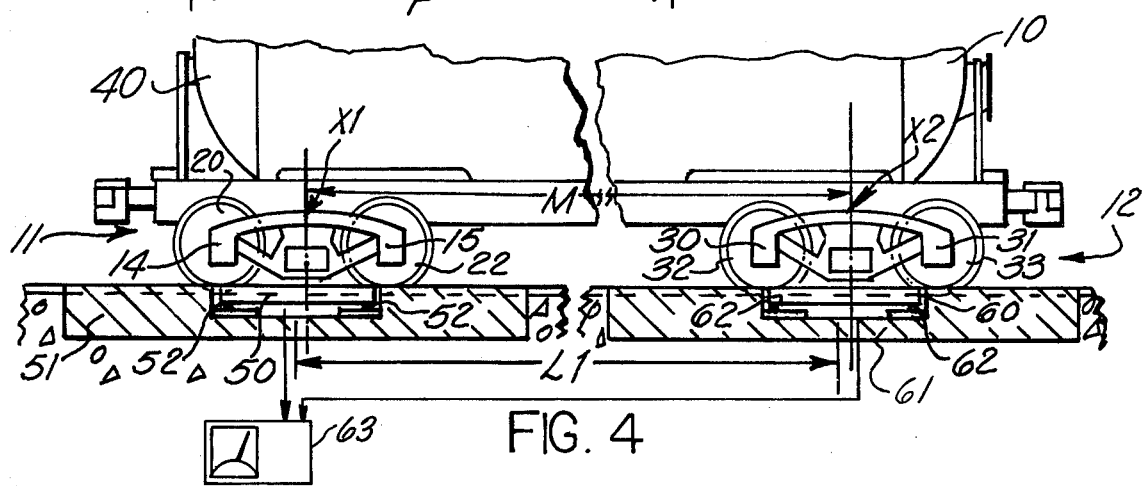
FIG. 4 illustrates the preferred spacing between the centers of the two weighing platforms.

As noted hereinabove, the present invention relates to a weighing system for weighing a vehicle which contains a body of liquid where the center of gravity of the body of liquid may shift in an uncontrollable manner within the vehicle. The invention is particularly applicable and advantageous when applied to a system for weighing torpedo cars for carrying molten metal, but is likewise applicable to systems for weighing of vehicles containing any type of liquid where the center of gravity of the body of liquid may shift.

The present invention is illustrated in FIG. 2 as applied to weighing a carrier 10. The carrier 10 has first and second groups of axles 11, 12 located at the forward and trailing ends of the carrier 10. The groups of axles 11, 12 are commonly termed bogeys. The group of axles or bogeys may be of any suitable construction, and a typical construction is shown in perspective in FIG. 1.

As shown in FIG. 1, the bogey 11 has a pair of axles 14, 15. The axle 14 carries a pair of wheels 20, 21. The axle 15 carries a pair of wheels 22, 23. The wheels 20, 22 are adapted to run on a rail 25, and the wheels 21, 23 run on a rail 26. The rails 25, 26 are conventional railroad rails for supporting and guiding the carrier 10. The bogey 11, as shown in FIG. 1, is pivotally supported relative to the carrier 10 about a pivot point X for purposes of enabling the car to traverse curves and the like, and also to enable the bogey to pivot in a vertical plane for traversing horizontally uneven rails.

For purposes of the present invention, it should be clearly understood that the weight of the carrier is applied to the bogey 11 symmetrically about the pivot point XI, so that each of the wheels is adapted to carry substantially the same fractional portion of the load applied to the bogey 11, except for the errors introduced by friction.

The bogey 12, shown in FIG. 2, is, as noted above, constructed similarly to the bogey 11, shown specifically in FIG. 1. The bogey 12, in general, has first and second axles 30, 31. The axle 30 carries a pair of wheels, only one of which is shown in FIG. 2 and which is designated 32, and likewise the axle 31 carries a pair of wheels, only one of which is shown in FIG. 2 and designated 33. The wheels carried by the axles 30, 31 likewise engage the rails 25, 26 in a manner similar to that described above in connection with the bogey 11. Further, it should be clear to those skilled in the art that the weight which is applied to the bogey 12 is equally distributed between the wheels carried by the axles 30, 31 and this weight is applied symmetrically about pivot point X2 and transmitted to the wheels.

The carrier 10 has a tank 40 which is adapted to receive and contain a body of liquid. The body of liquid may be any one of a variety of different liquids, such as molten metal, which is being transferred by the car. The car, of course, has a suitable fill opening 44 for receiving the liquid and a suitable means for effecting emptying of the car. The car as it is being filled or emptied may be on nonlevel track and the weight in the car shifts due to the nonlevel position of the car, causing an unequal distribution of the weight of the body of liquid on the wheels of the car. Likewise, during acceleration or deceleration of the car, the weight of the liquid tends to shift causing again an unequal distribution of the weight between the two pivot points X1 and X2.

FIG. 2 is a force diagram showing the displacement of the liquid during acceleration and the unequal weight forces $R_A$ and $R_B$ at the pivot points X1 and X2, respectively. The force $R_A$ is distributed between axles 14 and 15 resulting in forces $R_{A1}$ and $R_{A2}$. Because axles 14 and 15 are equidistant from a vertical plane drawn through pivot point X1, the resultant forces $R_{A1}$ and $R_{A2}$ are equal (except for friction). Similarly, since the axles 30 and 31 are equidistant from a vertical plane drawn through pivot point X2, the resultant forces $R_{B1}$ and $R_{B2}$ are equal (except for friction). $R_{A1}$ and $R_{A2}$ are generally equally distributed over the wheels on the respective axles because of the equal lateral spacing of the wheels from the pivot point X1. Likewise, $R_{B1}$ and $R_{B2}$ are generally equally distributed over the wheels on the respective axles. The principle of the present invention is that because the forces per axle within each of the axle groups are equal, the entire weight of the car may be calculated when only the load at one axle in each of the axle groups is known. Mathematically:

$$G = R_A + R_B; R_A = R_{A1} + R_{A2} = 2R_{A1}; R_B = R_{B1} + R_{B2} = 2R_{B1}; \text{ and } G = 2(R_{A1} + R_{B1})$$

The present invention is directed to a weighing system for weighing the carrier 10. The weighing system includes a pair of spaced platforms 50, 60 which have rail sections over which the carrier 10 rolls. The platforms are spaced and are so sized that the platform 50 will engage a fraction of the wheels of the bogey 11, while the platform 60 engages a fraction of the wheels of the bogey 12. Specifically, the platforms 50 and 60 engage only the wheels on one axle.

Since only a fraction of the wheels encounter or engage the platforms 50, 60, the platforms 50, 60 may be of relatively small size and will not encounter the total weight of the bogeys 11 and 12. Beam bending moments thus will be minimized in the platforms. Notwithstanding the size of the platforms, extremely accurate weighing can be accomplished, particularly by averaging of a plurality of weighings.

The platforms 50, 60 are preferably supported on foundations 51, 61 respectively. The centers of platforms 50, 60 are spaced apart a distance L1, which is equal to the distance M between the centers X1 and X2. The foundations are constructed so that the adjacent wheels of the bogey 11 will be supported on rails supported by the foundation 51. In other words, when the wheels 20, 21 are located on the weighing platform 50, the wheels 22, 23 will be supported by the foundation 51. The foundation is constructed so that the deflection of the weighing platform and deflection of the rails on which wheels not being weighed are supported are equalized. As a result, the wheels 22, 23 will not tend to excessively deflect the rails (as would occur if no foundation was utilized) and an accurate weight recording may be made. Likewise, when the wheels 32 are located on the platform 60, the wheels 33 will be supported by the foundation 61.

Interposed between the weighing platform 50 and the foundation 51 are suitable load or weight-sensing devices (load cells), generally designated 52, and which sense the load applied to the platform 50. Interposed between the weighing platform 60 and the foundation 61 are weight-sensing devices 62 (load cells) for sensing the weight applied to the weighing platform 60. The weighing platforms 50, 60 and sensing devices 52, 62 are shown schematically. The specific structure thereof can vary. U.S. Pat. Nos. 3,734,217 and 3,741,327 are typical of the type of structures that can be used.

The signals from the weight-sensing devices 52, 62 (load cells) may be combined in a suitable electronic system 63 to give the total weight of the load in a well-known manner. Accordingly, the electronics will not be described herein. Also, for averaging the weighings, a computer may be used which also would involve a conventional computer use. Further, of course, the readings may be read from an indicator and recorded and averages could be computed manually.

Also, in view of the fact that the weighing platforms 50, 60 are spaced apart, the chances of spillage of the material being carried encountering the weighing device is substantially lessened as compared to known prior art devices utilizing a complete platform for weighing the entire car. Further, the cost of the system is substantially lessened, and maintenance and repair are substantially lessened.

The optimal length for the weighing platform 50, as illustrated in FIG. 3, is as noted above such that only a fraction of the wheels will engage the platform 50. In this embodiment only the wheels of one axle will engage a single platform at any given time.

Figure 5:
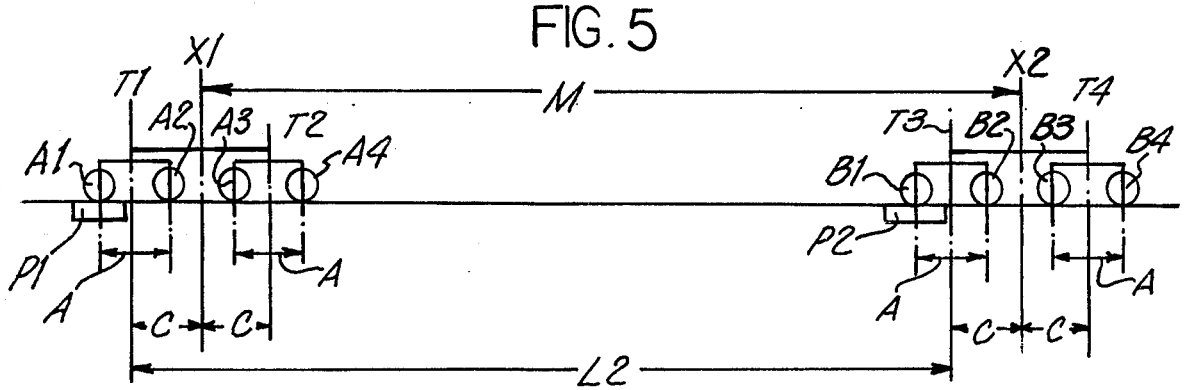
FIG. 5 illustrates the spacing characteristics of an axle grouping and weighing system providing many weighing positions.
Figure 6:
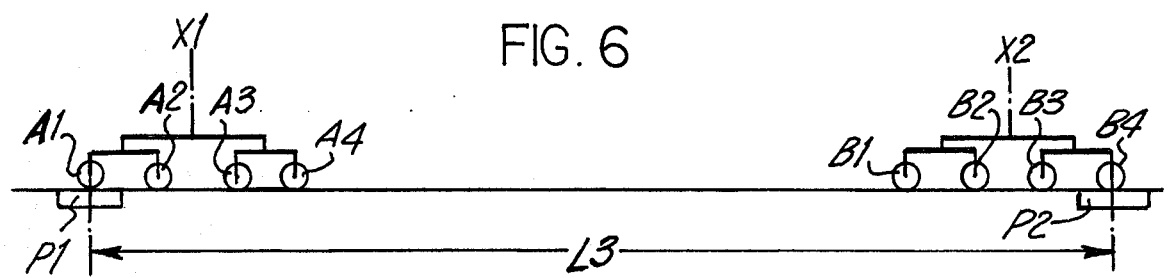
FIG. 6 illustrates spacing having a single weighing position.

Illustrated in FIG. 5 is a railroad car with four axles in each axle group. The axles within each group are symmetrically positioned from pivot axes X1 and X2 as the centers $T_1$, $T_2$, $T_3$ and $T_4$ are located a distance C from the axes X1 and X2 and axles in the individual pairs are located a distance A apart. The optimal spacing of the centers of the weighing platforms is shown in L2 where L2 is equal to M, the distance between pivot points X1 and X2. Utilizing this spacing, as the wheels of axle $A_1$ contact $P_1$, the wheels of axle $B_1$ will contact $P_2$. The process will then be repeated for corresponding axles as the car travels a distance approximately equal to four times the length of the platforms. Less desirable spacing is shown as L3 in FIG. 6 as the centers of the platforms are located a distance L3 apart whereby the wheels of the axles $A_1$ and $B_4$ engage platforms P1 and P2, respectively. The spacing shown in FIG. 5 is preferred, as it allows for multiple weighings as the car moves in one direction whereas the spacing shown in FIG. 6 would require back and forth movement of the car to provide multiple weighings.

The present invention is shown in FIG. 7 as applied to weighing a torpedo car 75 which has an opening 76 through which molten metal is flowed into the torpedo car. The tank of the car which receives the molten metal is supported for rotation by bearings, shown schematically at 80 and 81 for purposes of emptying the torpedo car.

In the embodiment of FIG. 7, the torpedo car is provided with bogeys 85, 86 at opposite ends thereof. Each of the bogeys 85, 86 includes eight axles. The weighing system, as shown in FIG. 7, includes a pair of platforms 90, 91 which are sized in order to encounter the wheels on a pair of axles of the bogeys 85, 86. Accordingly, in this embodiment, the platforms are such that the wheels carried by a pair of axles are weighed, as opposed to wheels carried by only one axle, as described above. Also, foundations 92, 93 are adjacent to each platform so as to support the wheels not engaging the platforms in such a manner as to provide an equal distribution of the load on each wheel within an axle group. The advantages of the system shown in FIG. 7 are the same as those discussed above.

From the above, it should be apparent that the weighing system embodying the present invention involves the weighing of the wheels of a fraction of the axles at the front and rear ends of a car carrying the liquid. In order to provide for accurate weighing, even though friction effects the accuracy of the weighing, a plurality of weighings of the car can be made and an average taken. In the case of the embodiment shown in FIGS. 5 and 7, the various weighings can be made as the vehicle moves across the weighing platforms. Further in the case of the embodiment shown in FIG. 6, as well as the embodiments of FIGS. 5 and 7, plural weighings can be made by having the car move in a back-and-forth manner across the weighing platform. Of course, in the embodiment of FIG. 6, the same wheels would encounter the weighing platform in each weighing, but still averaging the several weighings would cancel friction error assuming equilibrium of the bogey would not be the same for each weighing. If desired, a total weighing of material transmitted can be provided on a per-day or per-shift basis.

Also it should be clear from all the embodiments described that the fraction of the axles which encounter the platform at the front end of the car is the same as the fraction of the axles which engage the platform at the rear end of the car which is preferred. It would be possible to weigh a different fraction at each end by properly programming the computer or properly making the calculations based on the fractions weighed.

From the above, it should be clear that applicants have provided a substantially improved weighing system for weighing of vehicles which contain liquids where the liquids shift in an uncontrollable manner within the vehicles.

Having described the invention, what we claim is:

1. A method of weighing a vehicle containing a body of liquid where the center of gravity of the body of liquid may shift in an uncontrollable manner within the vehicle and which vehicle has a first group of axles at the forward end thereof and a second group of axles at the rearward end thereof with each axle having at least two wheels thereon and wherein the axles of each group are symmetrically spaced about a center through which the load is applied to the axle group, said weighing method including the steps of locating the wheels of a known fraction of the axles of the first group of axles on a first weighing platform, locating the wheels of a known fraction of the axles of said second group of axles on a second weighing platform, sensing the weight of said wheels on said first and second platforms, and providing an indication of the entire weight of said vehicle based upon said sensed weight and said known fractions.

2. A method as defined in claim 1 wherein said weighing platforms are located a distance apart equal to the distance between centers of the axle groups, and making repeated weighing of different wheels of said first and second groups by moving said vehicle over said platforms.

3. A method as defined in claim 1 further including the step of supporting said other wheels of said first and second axle groups while the said wheels thereof are being weighed.

4. A method of weighing as defined in claim 1 wherein said step of sensing the weight of said wheels on said platforms further comprises the steps of repeating weighing of different wheels but of the same fraction and averaging said weighing to provide said sensed weight.

5. A weighing system for weighing a vehicle containing a body of liquid where the center of gravity of the body of liquid may shift in an uncontrollable manner within the vehicle and which vehicle has a first group of axles at the forward end thereof and a second group of axles at the rearward end thereof with each axle having at least two wheels thereon and wherein the axles of each group are symmetriclly spaced about a center through which the load is applied to the axle group, said weighing system including first and second weighing devices, said weighing devices being spaced so that said first weighing device engages the wheels of a known fraction of the axles of the first group of axles and said second weighing device engages the wheels of a known fraction of the axles of said second group of axles, said weighing devices each providing measurements indicating the weight resting thereon, and means for providing an indication of the entire weight of the vehicle based upon said measurements and said known fractions.

6. A weighing system as defined in claim 5 wherein said weighing devices are located a distance apart which is equal to the distance between the centers of the axle groups at the opposite ends of the vehicle.

7. A weighing system as defined in claim 6 further including first and second foundations for supporting the other wheels of said first and second axle groups respectively while said wheels are in contact with said first and second weighing devices.

8. A weighing system as defined in claim 7 wherein each of said weighing devices have surfaces for engaging the wheels of the axles of the first and second groups, said first weighing device further including first weighing-sensing means for sensing the weight encountered thereby, and said second weighing device including second weight-sensing means for sensing the weight encountered thereby.

9. A weighing system as defined in claim 6 wherein said first and second weight-sensing means are interposed between said first and second foundations and said surfaces respectively.

* * * * *